US010296974B2

(12) United States Patent
Kittelsen

(10) Patent No.: US 10,296,974 B2
(45) Date of Patent: *May 21, 2019

(54) METHODS AND SYSTEMS FOR MONITORING MARKET DATA TO IDENTIFY USER DEFINED MARKET CONDITIONS

(71) Applicant: FTEN, INC., New York, NY (US)

(72) Inventor: Douglas G. Kittelsen, Evergreen, CO (US)

(73) Assignee: FTEN, Inc., New York, NY (US)

( * ) Notice: Subject to any disclaimer, the term of this patent is extended or adjusted under 35 U.S.C. 154(b) by 902 days.

This patent is subject to a terminal disclaimer.

(21) Appl. No.: 14/461,646

(22) Filed: Aug. 18, 2014

(65) Prior Publication Data

US 2015/0006354 A1  Jan. 1, 2015

Related U.S. Application Data

(63) Continuation of application No. 12/131,921, filed on Jun. 2, 2008, now Pat. No. 8,838,495.

(60) Provisional application No. 60/941,334, filed on Jun. 1, 2007.

(51) Int. Cl.
| | | |
|---|---|---|
| *G06Q 40/00* | (2012.01) | |
| *G06Q 40/04* | (2012.01) | |
| *G06Q 40/06* | (2012.01) | |

(52) U.S. Cl.
CPC ............. *G06Q 40/04* (2013.01); *G06Q 40/06* (2013.01)

(58) Field of Classification Search
CPC ....... G06Q 40/00; G06Q 30/08; G06Q 10/087

USPC ......................................................... 705/37
See application file for complete search history.

(56) References Cited

U.S. PATENT DOCUMENTS

| | | | | |
|---|---|---|---|---|
| 5,168,446 | A * | 12/1992 | Wiseman ............... | G06Q 40/04 340/4.5 |
| 5,497,317 | A * | 3/1996 | Hawkins ................ | G06Q 40/04 705/37 |
| 5,893,091 | A * | 4/1999 | Hunt .................. | G06F 17/30867 |
| 6,236,972 | B1 * | 5/2001 | Shkedy ................ | G06Q 10/087 705/26.1 |
| 6,314,468 | B1 * | 11/2001 | Murphy .............. | H04L 63/0428 709/217 |

(Continued)

OTHER PUBLICATIONS

U.S. Appl. No. 14/334,472, filed Aug. 18, 2014; Inventor: Kittelsen.

(Continued)

*Primary Examiner* — Daniel S Felten
(74) *Attorney, Agent, or Firm* — Nixon & Vanderhye P.C.

(57) ABSTRACT

Methods and systems for monitoring market data are disclosed. Real time data is collected that is related to conditions of a trading market. Collection occurs at an edge server associated with a liquidity destination trading at least one financial article of trade. The real time data that is collected can also be normalized if desired into a standard form. A user defined criteria is received from a centralized hub. The user defined criteria defines a particular event in the condition. It is then determined when a condition in the trading market matches the event. A response is generated providing notification of the occurrence of the event. The response is sent to the centralized hub for distribution to a user associated with the user defined criteria.

20 Claims, 4 Drawing Sheets

(56) References Cited

U.S. PATENT DOCUMENTS

| | | | | |
|---|---|---|---|---|
| 6,418,419 | B1* | 7/2002 | Nieboer | G06Q 40/00 |
| | | | | 705/37 |
| 6,532,460 | B1* | 3/2003 | Amanat | G06Q 40/06 |
| | | | | 705/36 R |
| 6,591,279 | B1 | 7/2003 | Emens et al. | |
| 6,763,384 | B1* | 7/2004 | Gupta | G06Q 30/08 |
| | | | | 709/224 |
| 6,957,199 | B1* | 10/2005 | Fisher | G06Q 20/02 |
| | | | | 705/50 |
| 7,035,819 | B1* | 4/2006 | Gianakouros | G06Q 20/10 |
| | | | | 705/37 |
| 7,096,494 | B1* | 8/2006 | Chen | G06Q 20/04 |
| | | | | 380/259 |
| 7,107,240 | B1* | 9/2006 | Silverman | G06Q 40/00 |
| | | | | 705/35 |
| 7,299,208 | B1* | 11/2007 | Bailon | G06Q 40/00 |
| | | | | 705/35 |
| 7,305,483 | B2* | 12/2007 | Yao | H04N 21/6125 |
| | | | | 375/E7.02 |
| 7,310,620 | B2* | 12/2007 | Moore | G06Q 20/382 |
| | | | | 705/1.1 |
| 7,430,533 | B1* | 9/2008 | Cushing | G06Q 30/08 |
| | | | | 705/35 |
| 7,512,557 | B1* | 3/2009 | Fishbain | G06Q 40/00 |
| | | | | 705/35 |
| 7,584,141 | B1* | 9/2009 | Andrews | G06Q 40/04 |
| | | | | 705/37 |
| 7,624,063 | B1* | 11/2009 | Andrews | G06Q 40/04 |
| | | | | 705/37 |
| 7,668,767 | B1* | 2/2010 | Borsand | G06Q 40/00 |
| | | | | 705/35 |
| 7,778,915 | B2* | 8/2010 | Angle | G06Q 40/04 |
| | | | | 705/35 |
| 7,860,796 | B2* | 12/2010 | Levy | G06Q 20/042 |
| | | | | 705/35 |
| 7,958,033 | B2* | 6/2011 | Wardley | G06Q 40/04 |
| | | | | 705/37 |
| 8,095,452 | B2* | 1/2012 | Doornebos | G06Q 40/00 |
| | | | | 705/35 |
| 8,182,340 | B2 | 5/2012 | Korp | |
| 2002/0013753 | A1 | 1/2002 | Marks de Chabris et al. | |
| 2002/0038270 | A1* | 3/2002 | Shin | G06Q 30/02 |
| | | | | 705/36 R |
| 2002/0087454 | A1 | 7/2002 | Calo et al. | |
| 2002/0111896 | A1* | 8/2002 | Ben-Levy | G06Q 30/08 |
| | | | | 705/37 |
| 2002/0156702 | A1 | 10/2002 | Kane | |
| 2002/0184237 | A1* | 12/2002 | McFeely | G06Q 10/10 |
| 2002/0194114 | A1 | 12/2002 | Erdmier | |
| 2003/0009419 | A1* | 1/2003 | Chavez | G06Q 40/025 |
| | | | | 705/38 |
| 2003/0033239 | A1* | 2/2003 | Gilbert | G06Q 40/04 |
| | | | | 705/37 |
| 2003/0041000 | A1* | 2/2003 | Zajac | G06Q 40/04 |
| | | | | 705/37 |
| 2003/0041006 | A1 | 2/2003 | Bunda | |
| 2003/0097327 | A1 | 5/2003 | Anaya et al. | |
| 2003/0120502 | A1 | 6/2003 | Robb et al. | |
| 2003/0139990 | A1* | 7/2003 | Greco | G06Q 40/00 |
| | | | | 705/35 |
| 2004/0059666 | A1 | 3/2004 | Waelbroeck et al. | |
| 2004/0139031 | A1* | 7/2004 | Amaitis | G06Q 50/188 |
| | | | | 705/80 |
| 2004/0243503 | A1* | 12/2004 | Eng | G06Q 30/04 |
| | | | | 705/37 |
| 2004/0260553 | A1 | 12/2004 | Niemi | |
| 2005/0044035 | A1 | 2/2005 | Scott | |
| 2005/0096966 | A1 | 5/2005 | Adi et al. | |
| 2005/0119964 | A1 | 6/2005 | Brady et al. | |
| 2005/0154668 | A1 | 7/2005 | Burns et al. | |
| 2005/0171887 | A1* | 8/2005 | Daley | G06Q 40/06 |
| | | | | 705/37 |
| 2005/0171891 | A1* | 8/2005 | Daley | G06Q 40/04 |
| | | | | 705/37 |
| 2005/0203825 | A1 | 9/2005 | Angele et al. | |
| 2005/0228735 | A1* | 10/2005 | Duquette | G06Q 40/06 |
| | | | | 705/37 |
| 2005/0251448 | A1* | 11/2005 | Gropper | G06Q 10/1093 |
| | | | | 705/14.61 |
| 2005/0273421 | A1 | 12/2005 | Rosenthal et al. | |
| 2005/0283415 | A1 | 12/2005 | Studnitzer et al. | |
| 2006/0129475 | A1 | 6/2006 | Badenhorst et al. | |
| 2006/0265317 | A1* | 11/2006 | Duquette | G06Q 40/06 |
| | | | | 705/37 |
| 2006/0271475 | A1* | 11/2006 | Brumfield | G06Q 20/10 |
| | | | | 705/39 |
| 2007/0067231 | A1 | 3/2007 | Marks de Chabris et al. | |
| 2007/0067460 | A1 | 3/2007 | Swildens et al. | |
| 2007/0088658 | A1 | 4/2007 | Rosenthal et al. | |
| 2007/0156568 | A1 | 7/2007 | Jovanovic et al. | |
| 2007/0156919 | A1 | 7/2007 | Potti et al. | |
| 2007/0288342 | A1 | 12/2007 | Maclin et al. | |
| 2008/0015970 | A1* | 1/2008 | Brookfield | G06F 9/52 |
| | | | | 705/37 |
| 2008/0059846 | A1* | 3/2008 | Rosenthal | G06Q 40/04 |
| | | | | 714/100 |
| 2008/0086352 | A1* | 4/2008 | Hibbert | G06Q 40/025 |
| | | | | 705/35 |
| 2008/0086401 | A1 | 4/2008 | Mather | |
| 2008/0228617 | A1* | 9/2008 | Johnson | G06Q 40/04 |
| | | | | 705/37 |
| 2008/0235146 | A1* | 9/2008 | Hirani | G06Q 50/188 |
| | | | | 705/80 |
| 2008/0243675 | A1* | 10/2008 | Parsons | G06Q 40/00 |
| | | | | 705/37 |
| 2008/0281750 | A1 | 11/2008 | Toffey et al. | |
| 2009/0234776 | A1 | 9/2009 | Bauerschmidt et al. | |
| 2009/0319417 | A1* | 12/2009 | Littlewood | G06Q 40/04 |
| | | | | 705/37 |
| 2010/0094743 | A1* | 4/2010 | Robertson | G06Q 40/00 |
| | | | | 705/37 |
| 2010/0332368 | A1* | 12/2010 | Alderucci | G06Q 40/04 |
| | | | | 705/37 |
| 2011/0166982 | A1* | 7/2011 | Cole | G06Q 40/04 |
| | | | | 705/37 |
| 2011/0225081 | A1* | 9/2011 | Kittelsen | G06Q 40/04 |
| | | | | 705/37 |

OTHER PUBLICATIONS

Office Action dated Sep. 11, 2013 in co-pending U.S. Appl. No. 12/873,148, pp. 1-9.
Office Action dated Aug. 23, 2013 in co-pending U.S. Appl. No. 12/914,699, pp. 1-25.
U.S. Appl. No. 13/018,014, filed Jan. 31, 2011; Inventor: Kittelsen et al.
U.S. Appl. No. 12/836,943, filed Jul. 15, 2010; Inventor: Angle et al.
U.S. Appl. No. 12/914,699, filed Oct. 28, 2010; Inventor: Cole et al.
U.S. Appl. No. 12/873,148, filed Aug. 31, 2010; Inventor: Cole et al.
Notification of Transmittal of International Preliminary Report and Written Opinion for International Application No. PCT/US10/54538 dated Jan. 4, 2011.
Notification of Transmittal of International Preliminary Report and Written Opinion for International Application No. PCT/US10/47394 dated Oct. 22, 2010.
Office Action dated Sep. 9, 2010 in co-pending U.S. Appl. No. 12/836,943.
International Search Report for PCT/US08/07025, dated Aug. 20, 2008.
Written Opinion of the International Searching Authority for PCT/US08/07025, dated Aug. 20, 2008.

* cited by examiner

METHODS AND SYSTEMS FOR MONITORING MARKET DATA TO IDENTIFY USER DEFINED MARKET CONDITIONS

CROSS-REFERENCES TO RELATED APPLICATIONS

This application is a continuation of U.S. patent application Ser. No. 12/131,921, filed Jun. 2, 2008, which claims priority of U.S. Provisional Application No. 60/941,334 filed Jun. 1, 2007, the entire contents of each of which are hereby incorporated by reference in this application.

TECHNICAL FIELD

The present technology relates to systems for consolidating and analyzing intraday issues related to securities transactions that have been submitted to liquidity destinations, and more specifically to systems and methods for monitoring market data to identify user defined market conditions using a distributed system of edge servers located at each of a plurality of liquidity destinations and a centralized hub for interfacing end users with the edge servers.

BACKGROUND

In today's financial securities industry, advances in technology and high-speed, high volume computerized algorithmic trading strategies have combined to make optimized speed critical to success. The markets began as a totally manual process where trade volumes were very small and the time to find a match was measured in minutes. With the advent of electronic alternative trading networks in the 1990's, much more volume was handled by computers without human intervention, which caused the relevant industry measure to move from minutes to seconds, from seconds to milliseconds, and most recently from milliseconds to microseconds.

Not only have the expectations of market processing time changed radically, but the number of total orders that are processed has grown exponentially. This growth in total order volume is driven by high-speed, high volume computerized algorithmic trading models that literally flood the markets by placing thousands of orders and cancels for orders per second as a means to exploit momentary imbalances within and/or between various liquidity destinations/ market centers to attempt the execution of "lightning quick" purchases.

Tremendous time and resources are invested by industry participants to minimize the length of time it takes to send transaction information to and from liquidity destinations/ market centers. As a result, the outer most limits of performance improvements available from using more powerful computer equipment and telecommunications capabilities are constantly being stretched. In addition, many of the high-speed, high-volume trading strategies include high cancellation rates if all the desired elements of a transaction are not present. This results in as many as one-thousand potential transactions being sent to liquidity destinations/ market centers for each transaction that is executed. Moreover, each order placed and cancelled generates additional market data that needs to be analyzed, which in turn may generate more market data, thus creating a feedback loop. As a result, this high volume of messages being sent to and from various liquidity destinations/market centers puts tremendous strain on telecommunications capabilities and creates "queuing" delays as messages are forced to wait until previously transmitted messaging traffic is processed.

Minimizing the time necessary to send transaction information to liquidity destinations/market centers is only part of the challenge. The market factors outlined above also result in a tremendous volume of message traffic emanating from the liquidity destinations/market centers related to the then-current state of the market for each of the numerous stock symbols and associated transactions ("market data"), all with widely varying degrees of importance and relevance.

For instance, prior art FIG. 1 illustrates how market data is aggregated together indiscriminately and sent down common communications lines in a typical data processing system. This aggregation causes significant delays and latency in delivering the market data necessary for market participants to make trading decisions in a timely manner. In particular, in the typical model illustrated in FIG. 1, the servers receiving the market data cannot keep up with the increasing flow of information. As a result, the incoming data is queued for processing, leading to additional latency. Also, once the queue has reached maximum capacity, market data can be dropped, which causes the loss of data and therefore the true understanding of the status of a symbol.

As shown in FIG. 1, the current industry approach for processing market data is to establish direct connectivity with the different exchanges and bring all the information that the exchanges publish to a group of servers that process the data needed by users or computerized algorithmic trading programs. The key drawbacks with this approach are the extremely high cost of transporting and processing such a huge amount of data, and the ability to do so in a timely fashion. Transmitting this large amount of aggregated, unanalyzed, non-normalized data introduces latency and delays in transmission times. In addition, only after this data is received in a common repository can it then be analyzed, which adds additional time, before it can be sent to end users according to their specific interests.

Further, as illustrated in prior art FIG. 1, existing market data systems can be analogized to sending a large number of multi-colored glass beads of varying sizes and colors emanating from multiple sources down a common aggregation funnel which is too small to receive all of the beads at one time so the beads queue up. Eventually all the glass beads will pass though the funnel and arrive at a common repository, at which point they can be analyzed and separated by color and size. If a user was interested in only seeing green glass beads of a specific size, they would have to wait for all of the different glass beads to pass through the tunnel and then wait for the proper size green glass beads to be separated from the rest, thereby increasing time for processing the market data.

SUMMARY

Methods and systems for monitoring market data are disclosed. An example includes collecting real time data that is related to conditions of a trading market. Collection occurs at an edge server associated with a liquidity destination trading at least one financial article of trade. The real time information is stored at the edge server. In addition, the real time data that is collected is also normalized into a standard form at the edge server. A user defined criteria is received from a centralized hub and is delivered and subsequently processed at the edge server. The user defined criteria defines a particular event in the condition. It is then determined when a condition in the trading market matches the event. A response is generated providing notification of the occurrence of the event. The response is sent to the centralized hub for distribution to a user associated with the user defined criteria.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF EXAMPLE EMBODIMENTS

Figure 1:
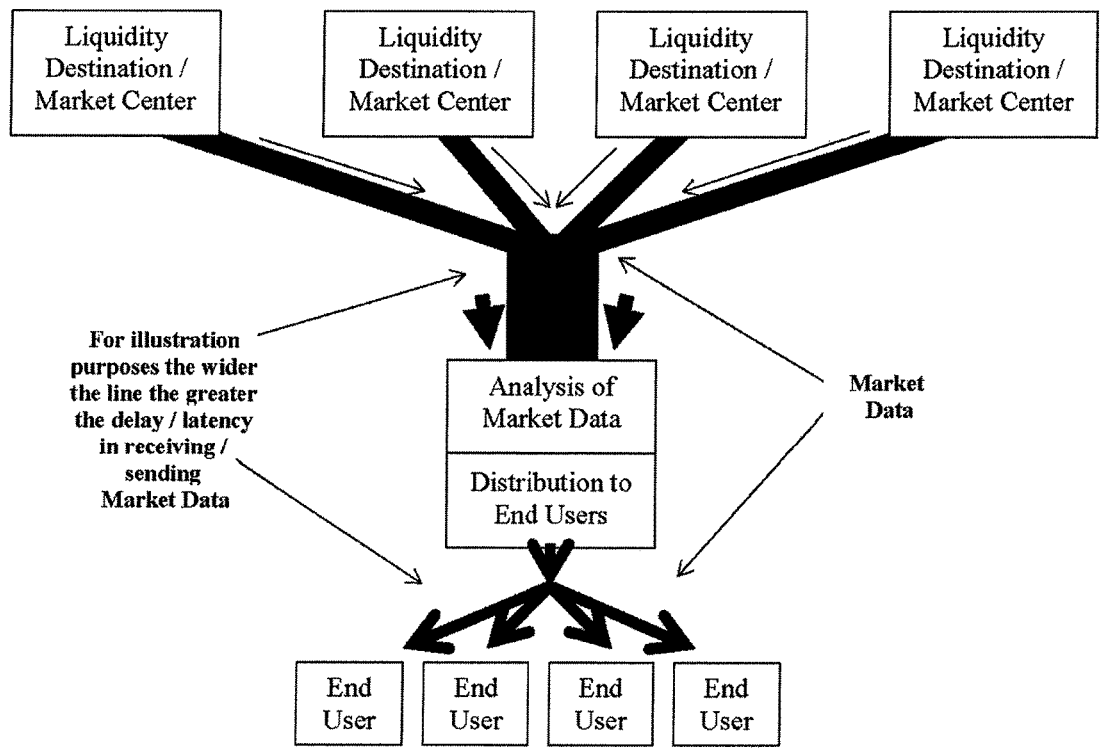
FIG. 1 is a diagram of a typical market data system that introduces latency when processing market data.

Reference will now be made in detail to non-limiting example embodiments that pertain to methods and systems for the monitoring of market data to identify user defined market conditions using a distributed system of edge servers located at each of a plurality of liquidity destinations and a centralized hub for interfacing end users with the edge servers. The claims are not to be limited to these example embodiments. On the contrary, the claims cover alternatives, modifications and equivalents.

Accordingly, embodiments provide for the collection and normalization of market data at their source. In addition, other embodiments are capable of distinguishing from a wide variety of events reflected in the market data. As such, certain user defined events are capable of being identified, and notification of the occurrence of the event is sent to the requesting user. Also, still other embodiments provide the added benefit of analyzing market data without performing any preliminary analysis of the relevance of different information to different end users.

Notation and Nomenclature

Embodiments can be implemented using a computer-implemented software program for processing data through a computer system. The computer system can be a personal computer, notebook computer, server computer, mainframe, networked computer (e.g., router), handheld computer, personal digital assistant, workstation, and the like. This program or its corresponding hardware implementation is operable for enabling the monitoring of market data. In one embodiment, the computer system includes a processor coupled to a bus and memory storage coupled to the bus. The memory storage can be volatile or non-volatile and can include removable storage media. The computer can also include a display, provision for data input and output, etc.

Some portion of the detailed descriptions that follow are presented in terms of procedures, steps, logic block, processing, and other symbolic representations of operations on data bits that can be performed on computer memory. A procedure, computer-executed step, logic block, process, etc. is here, and generally, conceived to be a sequence of operations or instructions leading to a desired result. The operations are those requiring physical manipulations of physical quantities. Usually, though not necessarily, these quantities take the form of signals, e.g., electrical or magnetic, capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that terms such as "defining," "receiving," "determining," "comparing," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

Figure 2:
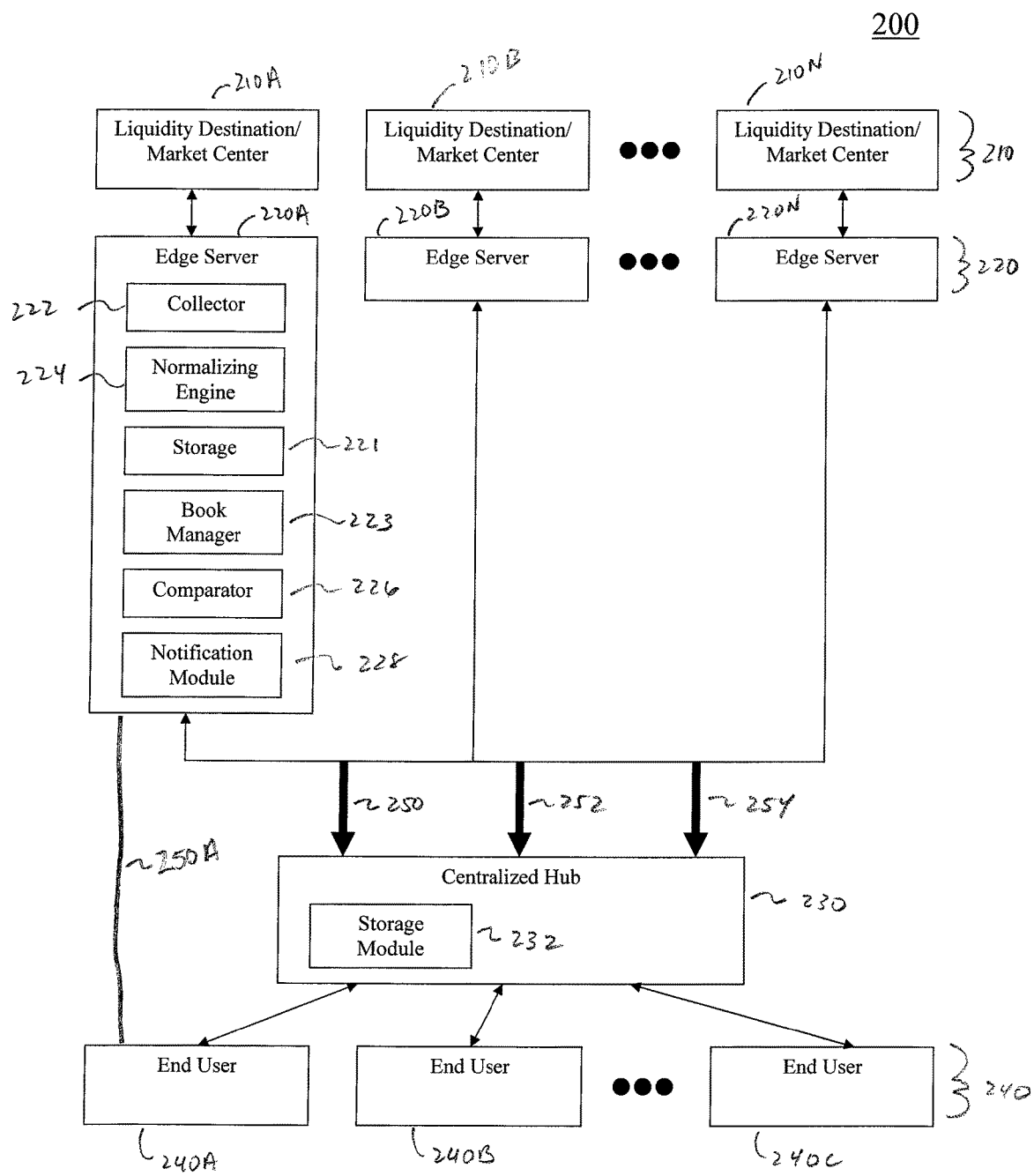
FIG. 2 is an illustration of a market data system configured such that edge servers located at the liquidity destinations are able to maintain real-time market books by symbol and to identify when user defined conditions occur in the market, in accordance with one example embodiment.

FIG. 2 is a data flow diagram illustrating the flow of information in a data processing system 200 capable of monitoring market data from a plurality of liquidity destinations/market centers 210. The subject of this application is a financial article of trade data processing system 200 including various functions, which may be implemented to perform consolidation and analysis of intraday issues related to submitted securities, commodities, options, futures transactions. The system 200 adapts the submitted securities, commodities, options, futures, or other financial articles of trade transaction to involve at least one of disparate systems, multiple parties and multiple liquidity destinations 210.

Reference to securities or security transactions within this disclosure should be interpreted as transactions involving securities, commodities, option or futures. The term "other financial articles of trade transaction" refers to any other article traded at the liquidity destinations other than securities, commodities, options, or futures articles of trade. It should be appreciated that different configurations can be used to consolidate and analyze the data to achieve a given result. Although particular combinations are disclosed, variations on those combinations can be used to achieve the same consolidation and analysis in the financial article of trade data processing system 200.

As such, embodiments enable users to take action promptly on an intraday basis to take advantage of real-time market conditions. In particular, the financial article of trade data processing system 200 is capable of identifying particular conditions within the market that are of interest to users of the processing system 200. As a result, once those market conditions are identified and notification of such is presented, the users can react accordingly to take advantage of those market conditions. For instance, a Strat 1 coordinated time stamp is added to each message received from the liquidity destination. As such, a comparison can be made to published time stamps from the liquidity destination to determine if there is a drift. If there is a difference in time stamps this is an indicator that the exchange is under load and not processing the market flow efficiently. This may create an opportunity to trade. In addition, this information is useful to ensure that there are no communication problems between the edge and a centralized hub.

As shown in FIG. 2, embodiments tackle the problem of handling the massive amounts of data by reversing the approach used to gather and transmit the data to be acted upon. In particular, rather than simply shipping all possible market data from the plurality of liquidity destinations 210 to a central location, dedicated computer processing power is placed as close to each liquidity destinations/market centers as possible. These servers are referred to as edge servers for purposes of the present application. For instance, each of the plurality of liquidity destinations 210 in the data processing system 200 is associated with one of a plurality of edge servers 220. For instance, liquidity destination 210A is associated with edge server 220A, liquidity destination 210B is associated with edge server 220B, and liquidity destination 210N is associated with edge server 220N.

While FIG. 2 shows one edge server associated with a corresponding liquidity destination, it is to be understood that one or more edge servers may support a single liquidity destination. For instance, different edge servers may be responsible for different ranges of symbols to distribute the load coming from the corresponding liquidity destination. Additionally, in other embodiments, a liquidity destination also represents a "dark pool" that is not an exchange, or a crossing engine (e.g., for internal crossing or matching inside a large clearing company), or any place that trade matching can occur and that publishes market data, or accepts indication of interest (IOI) messages.

As such, by locating dedicated computer processing resources (e.g., edge servers 220A-N) at or communicatively near the source of market data (e.g., liquidity destination 210AN), it is possible and affordable to have huge amounts of bandwidth to receive all the data generated by the exchange to the edge server for initial processing. The initial processing performed at each of the plurality of edge servers 210 will filter and normalize the data for this exchange as well as maintain a real-time market books by symbol (e.g., stock market symbol or name). Since this server is dedicated solely to a specific exchange, each available CPU cycle can be used to process and prepare the market data. In a case with multiple CPUs supporting a specific exchange, many more cycles are available to process and prepare the market data.

As an example, the components and features of edge server 220A is representative of the components and features of each of the plurality of edge servers 210. For instance, edge server 220A includes a collector 222 for collecting real time data at a corresponding liquidity destination. In this case, edge server 220A collects real time data from liquidity destination 210A that is trading at least one financial article of trade. In particular, edge server 220A receives raw market data from the liquidity destination 210A. For instance, raw data includes submitted and executed securities transactions particular to liquidity destination 210A.

In addition, edge server 220A includes a normalizing engine 224, which converts the real time data that is collected into a standard format. Normalization of the market data allows for ready analysis with market data from other liquidity destinations in the plurality of liquidity destinations 210.

Edge server 220A also includes a storage module 221. The normalized information is stored in the storage module 221 for purposes maintaining a history of the market conditions reflected at the liquidity destination 210A. In addition, other information based on the normalized information is also stored in storage module 221, as will be described below.

For instance, book manager 223 is able to process the normalized market data and maintain a Level 2 book (depth of book) information for every symbol traded on liquidity destination 210A. Level 2 book information includes the number of shares offered at varying price points that is different from the current bid and asking price for a particular symbol. In addition, each symbol may be associated with one or more standard industrial classification (SIC) codes. As such, it is possible to monitor one or more SIC codes, instead of the symbols. This allows for the monitoring of a family of related symbols based on the industries in which they participate.

In addition, from the Level 2 book information, the edge server 220A is able to determine the current Level 1 book information (e.g., current bid and ask pricing) for each of the symbols traded on the liquidity destination 210A. This information is stored and also delivered to the centralized hub 230 for distribution to any interested users in the plurality of users 240.

As the edge server 2120A receives and normalizes the data for liquidity destination 210A, it also ships the relevant data to the centralized hub 230. As shown in FIG. 2, the hub 230 is coupled to each of the plurality of edge servers 220, and in particular includes real-time communicative coupling to each edge server.

For instance, three independent data paths are enabled for each edge server, such as edge server 220A. Data path 250 is dedicated to the communication of real time, one-to-one message traffic from the edge server 220A to centralized hub 230. That is, as messages are generated by liquidity destination 210A and received by the edge server 220A, those messages are normalized and sent directly to the centralized hub 230 via data path 250, for distribution to interested users in the plurality of end users 240.

In another embodiment, the data path 250 includes a multicast channel 250A that is accessible to authorized users. FIG. 2 shows one such multicast channel 250A coupled between edge server 220A and end user 240A. Additional multicast channels coupling various edge servers and users are not shown in FIG. 2. As such, the normalized data communicated over data path 250 is passed from an edge server to the end user, without necessarily having to route through the centralized hub 230.

In addition, data path 252 is dedicated to signal management. In particular, attributes representing certain market conditions as defined by an end user are delivered to the centralized hub 230. For instance, end user 240A is interested in determining if and when a particular market condition exists for one or more symbols or SIC codes traded on the plurality of liquidity destinations 210. This desire is expressed in a request for notification of the condition that is delivered to the centralized hub 230 from a requesting user. This market condition can be represented by one or more attributes of a proprietary protocol that is recognized by system 200, and in particular, by hub 230 and each of the plurality of edge servers 220. These attributes can focus on any aspect of the market data being processed and accumulated at the edge server 220A, and can include a specific symbol, a group of symbols, price changes of symbol(s), time drift that senses a market is overloaded and responding slowly, etc. In addition, the attributes can include and describe the available liquidity on the market, as implied in Level 2 information, as part of the data that is used for defining a market condition. As a result, the market condition defines an event that is further defined by one or more attributes, as outlined in the request delivered to the hub 230 from the end user 240A. When events in the market data match the request, the user will receive a response and can make a trading decision based on the knowledge that the event has occurred. In one embodiment, the trade decision is automatically processed based on predefined instructions.

More particularly, the request is delivered from the centralized hub 230 to the corresponding edge server supporting the liquidity destination that is trading on the one or more symbols, such as edge server 220A over path 252 via data path 252. Moreover, the hub 230 persists the monitoring request and passes the request to the particular venues named in the request. For instance, in the case of edge server 220A, it creates the necessary mapping rules to evaluate the market data received that that point forward to see if it matches the pattern requested in the request. That is, comparator 226 performs the functions necessary to identity when events match the requested market conditions.

In addition, centralized hub 230 also maintains a cache of all open requests so it can query the current active signals for a requesting customer. That is, hub 230 is able to determine the status of a particular request as monitored by each of the plurality of edge servers 220.

Because the centralized hub 230 acts as an interface between the plurality of end users 240 and the plurality of edge servers 220, a user can add, delete, or update a monitoring request at any time in the trading day. As such, requests can be updated to reflect current market conditions.

Furthermore, data path 254 is dedicated to the communication of results from the request. That is, once an event is recognized by the comparator 226 of edge server 220A, notification of the occurrence of the event is presented to the centralized hub via data path 254. For instance, notification module 228 generates the notification of the occurrence of the event, and also delivers the notification to the centralized hub 230 via data path 254 for distribution to interested end users. In addition, as signal responses (e.g., notifications) are received from edge server 220A, they are stored in a local cache 232. Because the data path 254 is dedicated to communicating results, receiving systems can give signal responses the highest level of priority.

The centralized hub 230 acts as the coordinator that dynamically determines what data must be shipped between the plurality of edge servers 220 and the centralized hub 230, based on the specific needs of each of the plurality of end users 240. For instance, the centralized hub 230 receives requests for particular information from each of its consumers and then immediately formulates how to gather the appropriate data to meet that specific user's request. Since each of the plurality of edge servers 220 have already normalized the data and maintained their own market book for each symbol, the centralized hub 230 can simply request the specific information that it needs for the specific user, in one embodiment. That data and subsequent updates to that data will automatically flow from all relevant edge servers to the centralized hub 230 for final merging, consolidation, and delivery to interested users on an ongoing basis.

For instance, in one embodiment, the centralized hub 230 acts a comparator when determining if a cross-venue condition exists. In this case, the comparator at any edge server would not be able to determine the existence of the cross-venue condition for lack of information; however, the centralized hub is in a position to recognize the cross-venue condition. Specifically, a monitoring request is generated by a user. The monitoring request enables the monitoring of events occurring at more than one venue (liquidity destination). As previously described, the centralized hub 230 is able to determine which information is necessary from each of the venues in question. As such, the centralized hub 230 is able to request the necessary information from each of the necessary edge servers. Moreover, the centralized hub 230 aggregates individual signals from the corresponding edge servers. Further analysis is performed by the centralized hub 230 to determine if the individual signals in combination indicate that the cross-venue condition exists. Only when the cross-venue condition exists will the centralized hub 230 generate the notification signal for delivery to the appropriate user associated with the request.

In one particular embodiment, a user can register with the centralized hub 230 to monitor a list of symbols being traded in corresponding liquidity destinations. As a result, data processing system 200 will send snapshots of a corresponding symbol that describes the latest changes of the symbol over a given time period. These snapshots are used to determine a current state of a corresponding symbol. As such, the user is able to determine a proper course of action with regards to the market conditions for the corresponding symbol.

As a representative example, a symbol being traded on liquidity destination 210A is the subject of snapshot. As such, edge server 220A will take snapshots of the current state of the corresponding symbol every x microseconds (where x is configurable). These snapshots provide updates to the previously known state of the corresponding symbol, and is sent to the centralized hub 230. In particular, the snapshots reflect the net changes that have occurred since the last snapshot. If the book has not changed since the last snapshot—no new snapshot will occur. If the liquidity destination 210A is very busy—the impact off the snapshot approach is most beneficial. For instance, if in the snapshot window liquidity destination 220A generated one thousand messages, the edge server 220A would generate and send a single snapshot message, that includes the net effect of those one-thousand messages, to the centralized hub 230, for consolidation and updating of the corresponding market wide book.

As described, the centralized hub 230 will receive the snapshot from edge servers 220A-N supporting the plurality of liquidity destinations 210 and combine them into a consolidated book for each symbol. In addition, the centralized hub 230 also supports requests from a user (e.g., one of users 240A-N) asking to register interest in a symbol. If a user has registered interest in a name, the current book state is generated for the symbol, based on previously received snapshot information, and delivered to the user from the centralized hub 230. This allows a user to come into the markets mid-day and immediately get the current state of any name and receive all relevant snapshots until they deregister.

The technology described provides very fast delivery of relevant market data to consumers by sending what is necessary or desired, preprocessing the data as it appears at the exchange in order to streamline the merging of data from the many exchanges, and reducing the total amount of bandwidth that is necessary. In addition, as the volume of market data increases on the liquidity destinations 210, the time and data processing saving benefits provided by the plurality of edge servers 220 further increase.

Figure 3:
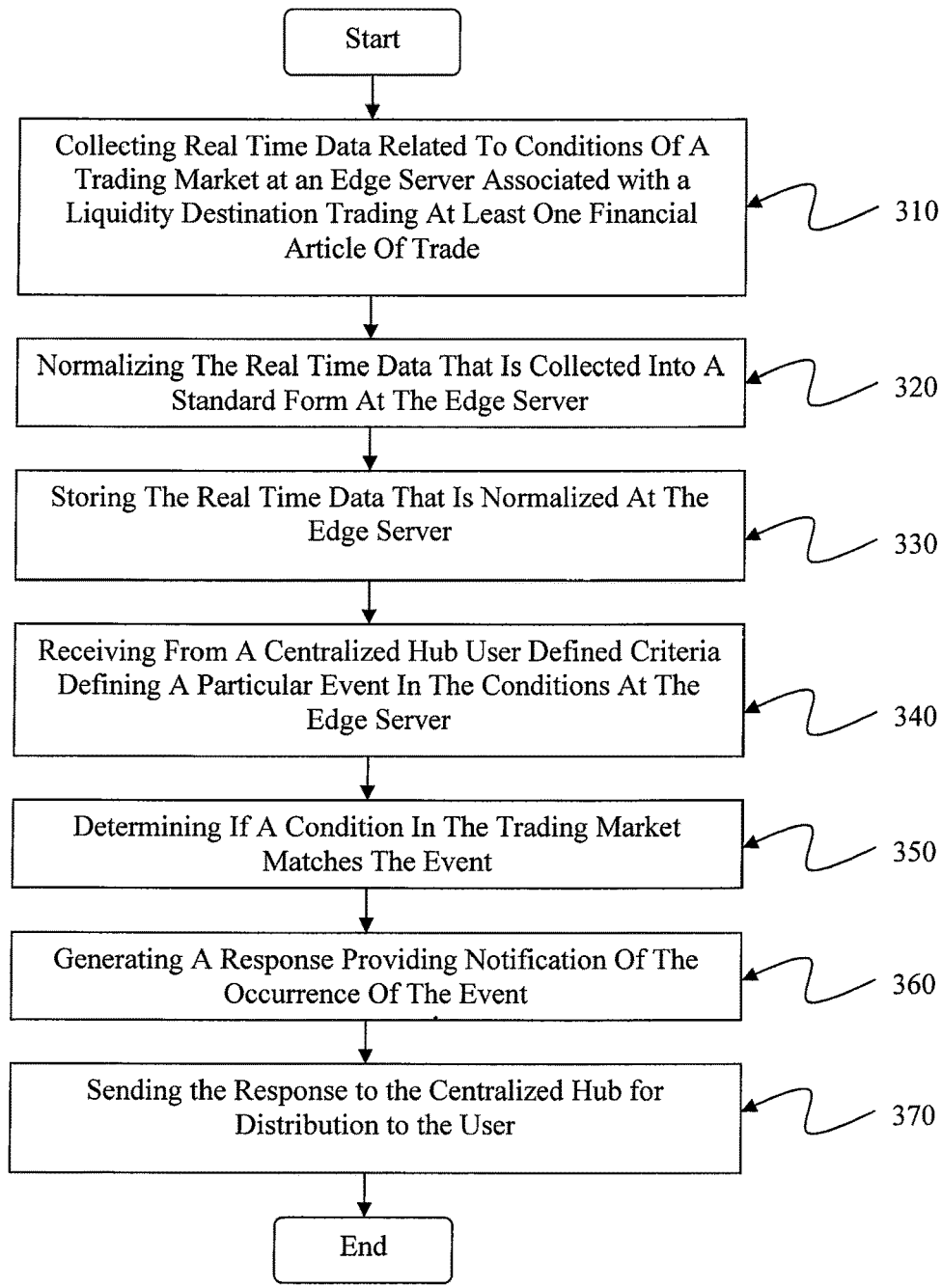
FIG. 3 is a flow diagram illustrating a method for monitoring market data from the viewpoint of an edge server at a liquidity destination, in accordance with one example embodiment.

FIG. 3 is a flow diagram 300 illustrating a method for monitoring market data from the viewpoint of an edge server associated with a liquidity destination, in accordance with one non-limiting example embodiment. The method of 300 is implemented by the data processing system 200 of FIG.

2 in one embodiment, and more particularly, by each of the plurality of edge servers 220. That is, the functionality of an edge server is described in flow diagram 300.

At 310, real time data is collected at the edge server that is associated with a corresponding liquidity destination. The real time data is related to market conditions at the corresponding liquidity destination trading at least one financial article of trade. For instance, the real time data collected relates to Level 2 depth of book information for symbols traded on the corresponding liquidity destination. As described previously, each liquidity destination is associated with an edge server for purposes of relieving the data flow presented to a centralized hub that interfaces with a plurality of end users. In one embodiment, collector 222 of edge server 220A in FIG. 2 implements the functionality of 310 to collect real-time data.

At 320, the real time data is normalized at the corresponding edge server. In particular, the real-time data is normalized into a standard form. That is, the real-time data is translated into an appropriate normalized format that is suitable for analysis and comparison to other data collected by other edge servers associated with other liquidity destinations. In this manner, a distributed system for the collection of market data is achieved, such that all market data for a particular symbol can be collected on various liquidity destinations and normalized for consolidation and analysis. In one embodiment, the normalizing engine 224 of FIG. 2 implements the functionality of 320.

At 330, the real time data that is normalized is stored at the corresponding edge server associated with the liquidity destination. In this manner, the history of the market conditions for a liquidity market is accessible at the corresponding edge server in case the information is lost at the centralized hub. In addition, analysis on the real time data that is normalized can be performed in order to recognize user defined market events, and for purposes of sending snapshots of market conditions over a period of time. In one embodiment, the storage module 221 of FIG. 2 implements the functionality of 330.

At 340, user defined criteria is received from a centralized hub that interfaces with a plurality of end users. The user defined criteria is received at the corresponding edge server associated with the liquidity destination. The user defined criteria defines a particular event as described by market conditions at the corresponding liquidity destination. For instance, the event may involve information related to state of book for one or more symbols traded on the liquidity destination, or be based on particular parts of a book (e.g., the top three price points). As such, embodiments are able to implement a system for identifying when a predefined event occurs, wherein the identification is performed at the edge server associated with the corresponding liquidity destination. Comparator 226 is capable of performing the operation at 340.

At 350, a condition in the trading market associated with the liquidity destination is compared to the event. For instance, comparator 226 performs the operation at 350, in one embodiment. In this manner, instead of only sending normalized data to the centralized hub, or to the end user for further analysis, the edge server is able to identify particular events that are important to an end user.

At 360, the edge server generates a response that provides notification of the occurrence of the event. More particularly, a notification signal that is recognizable by the user requesting the notification is generated. In one case, the notification signal is provided by the user in the original request. As such, the user is able to define the format of the signal response, or notification signal, and the underlying name of the signal to match their particular processing needs. Upon receipt of the notification signal, the user is able to immediately recognize that the event of interest, as described by market conditions, has occurred. The user is able to react accordingly in a time sensitive fashion.

At 370, the response is sent to the centralized hub for distribution to the interested user making the original request. The centralized hub acts as the interface between the end users and the edge servers supporting the plurality of liquidity destinations. The response includes the necessary information for the centralized hub to correctly direct the information to the appropriate user.

Figure 4:
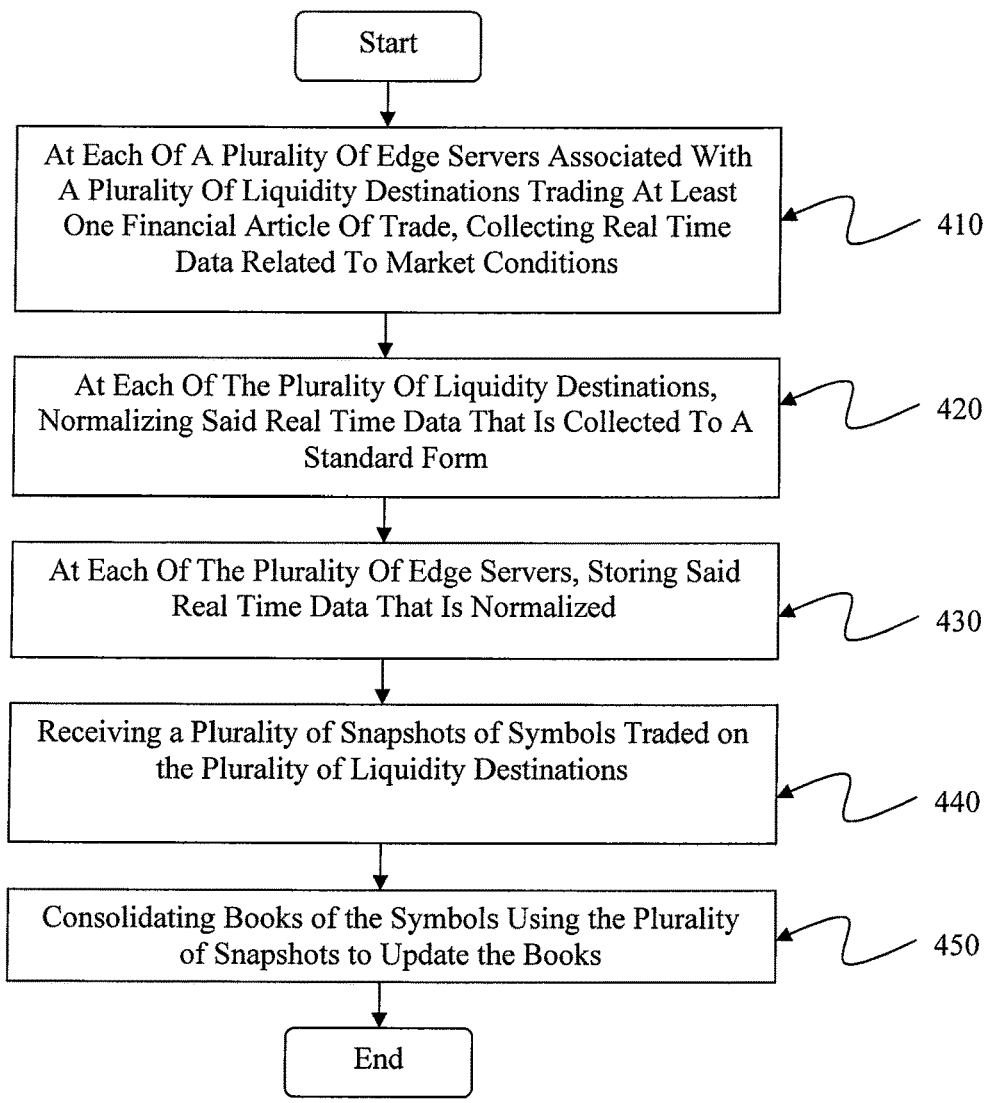
FIG. 4 is a flow diagram illustrating a method for monitoring market data from an overall viewpoint of a system capable of implementing the method, in accordance with one example embodiment.

FIG. 4 is a flow diagram 400 illustrating steps in a method for providing snapshots of market conditions, in accordance with one non-limiting example embodiment. The operations provided in flow diagram 400 may be implemented by system 200 of FIG. 2, in one embodiment.

Operations outlined in 410, 420, and 430 are analogous to operations 310, 320, and 330, respectively, as previously described in relation to FIG. 3. The operations in flow diagram 400 are applied to a plurality of edge servers supporting a plurality of liquidity destinations, instead of a single edge server supporting a corresponding liquidity destination, as described in FIG. 3. As such, the description in relation to 310, 320, and 330 is applicable to operations 410, 420, and 430 for each of the edge servers. In particular, each of the plurality of edge servers collect real-time data that is related to market conditions. In addition, the real-time data that is collected is further normalized into a standard format for analysis and comparison such that market data collected across a distributed system of edge servers can be compared readily in a common format. In addition, the real-time data that is normalized is stored at corresponding edge servers.

At 440, a plurality of snapshots of symbols traded on the plurality of liquidity destinations is generated at each of the plurality of edge servers. The snapshot comprises a net effect of trading activity on a corresponding symbol for a given time period. In addition, the plurality of snapshots is communicated to the centralized hub that interfaces with a plurality of end users. In one embodiment, if the net effect is approximately zero, then the snapshot is not communicated to the centralized hub. As such, in conjunction with 440, the plurality of snapshots is also received at the centralized hub.

In this manner, the centralized hub is able to consolidate all the snapshots received from the plurality of edge servers supporting a plurality of liquidity destinations to provide a consolidated view of the symbols traded on the liquidity destinations. That is, at 450, books of the symbols traded on the liquidity destinations are consolidated using the plurality of snapshots. For instance, Level1 and Level 2 book information from all the liquidity destinations are consolidated at the centralized hub. More particularly, each snapshot is combined with a previous state of the corresponding book of a corresponding symbol. In this, manner the corresponding book is updated to obtain a current state. The state of the book is available for distribution to interested users.

Accordingly embodiments provide for the collection and normalization of market data at their source. In addition, other embodiments are capable of distinguishing from a wide variety of events reflected in the market data. As such, certain user defined events are capable of being identified, and notification of the occurrence of the event is sent to the requesting user.

While the methods of embodiments illustrated in flow charts 3 and 4 show specific sequences and quantity of operations, the technology described is suitable to alternative embodiments. For example, not all the operations provided for in the methods presented above are required. Furthermore, additional operations can be added to the operations presented in the present embodiments. Likewise the sequences of operations can be modified depending upon the application.

Example method and system embodiments for the monitoring of market data to identify user defined market conditions using a distributed system of edge servers located at each of a plurality of liquidity destinations and a centralized hub for interfacing end users with the edge servers, are thus described. While specific embodiments have been described and illustrated, it is to be understood that numerous changes and modifications may be made therein without departing from the spirit and scope of the appended claims and equivalents thereof. Furthermore, it should be appreciated that the claims should not be construed as limited by such embodiments, but rather construed according to the below claims.

The invention claimed is:

1. A method for consolidating and analyzing volumes of market data generated by multiple liquidity destination market centers at different locations remote from each other, the market data generated by each of the multiple liquidity destination market centers including trading interest information, trading match information, and trading condition information, the method comprising:
   at each of a plurality of dedicated edge servers, wherein each dedicated edge server is physically or communicatively near a corresponding one of the multiple liquidity destination market centers, and each dedicated edge server is configured to communicate over a network with a central processing system, performing the following steps:
   collecting the market data generated by the corresponding liquidity destination market center;
   receiving over the network user-defined information defining particular market data events associated with different users;
   processing the market data received from the corresponding liquidity destination market center to determine when conditions identified by the dedicated edge server in the market data generated by the corresponding liquidity destination market center match ones of the defined market data events;
   detecting matches of ones of the defined market data events in the market data generated by the corresponding liquidity destination market center;
   generating notification signals for each matched defined market data event;
   sending over the network a first one of the notification signals to the central processing system for distribution to a first user node indicating an occurrence of a matched defined market data event associated with user-defined information for a first user; and
   sending over the network a second one of the notification signals to the central processing system for distribution to a second user node indicating an occurrence of a matched defined market data event associated with user-defined information for a second user.

2. The method of claim 1, wherein the collecting the market data step comprises each dedicated edge server:
   collecting Level 2 depth of book information as the data for symbols traded on the corresponding liquidity destination market center.

3. The method of claim 2, further comprising each dedicated edge server:
   analyzing the Level 2 book information to determine Level 1 top of book information for symbols traded on the corresponding liquidity destination market center; and
   sending the Level 1 top of book information to the central processing system for distribution.

4. The method of claim 1, further comprising each dedicated edge server:
   sending the first notification signal to the central processing system in a one-to-one message ratio, and
   sending the first notification signal to the central processing system in a one-to-one message ratio.

5. The method of claim 1, further comprising each dedicated edge server:
   for a given time period, determining a net effect of trading activity on a symbol traded on the liquidity destination market center; and
   sending a snapshot of the symbol including the net effect to the central processing system for consolidation and updating,
   wherein the snapshot is combined with a previous state of a book of the symbol at the hub to update the state.

6. The method of claim 5, wherein the sending a snapshot further comprises:
   declining to send the snapshot when the net effect is zero.

7. The method of claim 1, further comprising each dedicated edge server:
   comparing time stamps provided by the liquidity destination market center and as reported to determine when the market is falling behind.

8. The method of claim 1, wherein the collecting the market data step further comprises each dedicated edge server collecting real time data from the corresponding liquidity destination market center.

9. A method for consolidating and analyzing volumes of market data generated by multiple liquidity destination market centers at different locations remote from each other, the market data generated by each of the multiple liquidity destination market centers including trading interest information, trading match information, and trading condition information, the method comprising:
   at a central processing system, wherein the central processing system is configured to communicate over a network with a plurality of dedicated edge servers, and wherein each dedicated edge server is physically or communicatively near a corresponding one of the multiple liquidity destination market centers, performing the steps of:
   receiving a first request data message associated with a first user for monitoring a first event in market conditions, where the request data message includes user-defined information that defines the first event;
   receiving a second request data message associated with a second user for monitoring a second event in market conditions, where the request data message includes user-defined information that defines the second event;
   sending the user-defined information as defined in the request data message to ones of the plurality of dedicated edge servers;
   receiving from a first dedicated edge server a first response data message to the first request data message indicating an occurrence of the first event;

receiving from a second dedicated edge server a second response data message to the second request data message indicating an occurrence of the second event;

in response to receiving the first response data message, transmitting to a first node associated with the first user a first notification message indicating an occurrence of the first event; and in response to receiving the second response data message, transmitting to a second node associated with the second user a second notification message indicating an occurrence of the second event.

10. The method of claim 9, further comprising the central processing system:

receiving data that is normalized from each of the plurality of dedicated edge servers in an approximate one-to-one message ratio for distribution to users.

11. The method of claim 9, further comprising the central processing system:

storing the first and second request data messages; and querying dedicated edge servers for updates on the first and second request data messages.

12. The method of claim 9, further comprising the central processing system:

receiving Level 1 book information from the plurality of dedicated edge servers for symbols traded on the plurality of liquidity destination market centers for distribution to users.

13. A dedicated edge server physically or communicatively near a corresponding one of a plurality of liquidity destination market centers, each of the plurality of liquidity destination market centers being located at different locations remote from each other, the dedicated edge server comprising:

one or more computer processing units coupled to one or more memories and configured to:

collect market condition data related to market conditions generated by the corresponding liquidity destination market center, the market condition data including trading interest information, trading match information, and trading condition information;

store the collected market condition data;

receive over a network user-defined information defining particular market data events associated with different users;

processing the market data received from the corresponding liquidity destination market center to determine when a condition identified by the dedicated edge server in the market data generated by the corresponding liquidity destination market center matches ones of the defined market data events;

detect matches of ones of the defined market data events in the market data generated by the corresponding liquidity destination market center;

generate notification signals for each matched defined market data event;

send a first one of the notification signals over a network to a central processing system for distribution to a first user node indicating an occurrence of a matched defined market data event associated with user-defined information for a first user; and send a second one of the notification signals over the network to the central processing system for distribution to a second user node indicating an occurrence of a matched defined market data event associated with user-defined information for a second user.

14. The distributed edge server of claim 13, wherein the one or more computer processing units is configured to:

determine a net effect of trading activity on a symbol traded on the liquidity destination market center for a given time period; and send a snapshot of the symbol including a net effect to the central processing system for consolidation and updating.

15. The distributed edge server of claim 14, wherein the one or more computer processing units is configured to decline to send the snapshot to the central processing system when the net effect is zero.

16. The distributed edge server of claim 13, wherein the one or more computer processing units is configured to compare time stamps provided by the liquidity destination market center and as reported to determine when the market is falling behind.

17. A centralized hub comprising:

a computer system configured to:

receive a first request data message associated with a first user for monitoring a first event in market conditions, where the request data message includes user-defined information that defines the first event;

receive a second request data message associated with a second user for monitoring a second event in market conditions, where the request data message includes user-defined information that defines the second event;

send the user-defined information as defined in the request data message to ones of a plurality of dedicated edge servers, each dedicated edge server being physically or communicatively near a corresponding one of multiple liquidity destination market centers and communicates over a network with the computer system, where the multiple liquidity destination market centers are at different locations remote from each other, where each of the multiple liquidity destination market centers generates market data including trading interest information, trading match information, and trading condition information, and where each dedicated edge server collects data related to market conditions for theme corresponding liquidity destination market center;

receive from a first dedicated edge server a first response data message to the first request data message indicating an occurrence of the first event;

receive from a second dedicated edge server a second response data message to the second request data message indicating an occurrence of the second event;

in response to receiving the first response data message, transmit to a first node associated with the first user a first notification message indicating an occurrence of the first event; and in response to receiving the second response data message, transmit to a second node associated with the second user a second notification message indicating an occurrence of the second event.

18. The centralized hub of claim 17, wherein the computer system is configured to receive data that is normalized from each of the plurality of dedicated edge servers in an approximate one-to-one message ratio for distribution to users.

19. The centralized hub of claim 17, wherein the computer system is configured to receive Level 1 book information from the plurality of dedicated edge servers for symbols traded on the plurality of liquidity destination market centers for distribution to users.

20. The centralized hub of claim 17, wherein the computer system is configured to receive a plurality of snapshots of a plurality of symbols traded on the plurality of liquidity destination market centers, wherein a snapshot comprises a net effect of trading activity on a corresponding symbol for a given time period, and configured to consolidate books of the plurality of symbols traded on the plurality of liquidity destination market centers using the plurality of snapshots by updating the books, wherein the snapshot is combined with a previous state of a corresponding book of the corresponding symbol for updating a current state the corresponding book for distribution to users.

* * * * *